United States Patent
Ikawa et al.

(10) Patent No.: US 8,893,474 B2
(45) Date of Patent: Nov. 25, 2014

(54) EXHAUST EMISSION CONTROL DEVICE OF DIESEL ENGINE

(75) Inventors: Yoshikatsu Ikawa, Tokyo (JP); Hiroyuki Endo, Tokyo (JP); Kazunari Ide, Tokyo (JP); Ko Takayanagi, Tokyo (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 91 days.

(21) Appl. No.: 13/807,191

(22) PCT Filed: Aug. 22, 2011

(86) PCT No.: PCT/JP2011/068862
§ 371 (c)(1),
(2), (4) Date: Mar. 26, 2013

(87) PCT Pub. No.: WO2012/053279
PCT Pub. Date: Apr. 26, 2012

(65) Prior Publication Data
US 2013/0177482 A1      Jul. 11, 2013

(30) Foreign Application Priority Data
Oct. 20, 2010  (JP) .................................. 2010-235966

(51) Int. Cl.
*F01N 3/00*      (2006.01)
*F02D 41/02*     (2006.01)
(Continued)

(52) U.S. Cl.
CPC .............. *B01D 53/9495* (2013.01); *Y02T 10/26* (2013.01); *F02D 41/0235* (2013.01); *F02D*
(Continued)

(58) Field of Classification Search
CPC .............. B01D 53/9495; F02D 41/029; F02D 41/0235; F02D 41/025; F02D 41/1401; F02D 41/1446; F02D 41/405; F02D 41/0245; F02D 2041/1409; F02D 2041/141; F02D 2200/0802; F02D 2200/101; F01N 3/106; F01N 2900/1602; Y02T 10/26; Y02T 10/44
USPC ................................................... 60/272–324
See application file for complete search history.

(56) References Cited

U.S. PATENT DOCUMENTS 7,169,364 B2    1/2007   Ohtake et al.
8,020,372 B2    9/2011   Mullins et al.
(Continued)

FOREIGN PATENT DOCUMENTS

CN          1519462 A     8/2004
CN          1891988 A     1/2007
(Continued)

OTHER PUBLICATIONS

International Preliminary Report on Patentability and Written Opinion of the International Searching Authority issued May 8, 2013 in corresponding International Application No. PCT/JP2011/068862 (with English translation).

(Continued)

*Primary Examiner* — Jesse Bogue
(74) *Attorney, Agent, or Firm* — Wenderoth, Lind & Ponack, L.L.P.

(57) ABSTRACT

A DPF target temperature setting unit has a temperature increase rate setting portion which sets a temperature increase change rate such that, until a target set temperature at which PM is burnt is reached after the start of late post injection, the temperature increase change rate is reduced in accordance with an increase in temperature or a period of time elapsed since the start of the late post injection, a stepwise temperature increase change rate in the temperature increase rate setting portion includes two stages of a first-stage change rate A and a second-stage change rate B lower than the first-stage change rate, and a target temperature of the DPF temperature is calculated by using the temperature increase rate of the temperature increase rate setting portion.

12 Claims, 5 Drawing Sheets

(51) Int. Cl.
  *F02D 41/14* (2006.01)
  *F02D 41/40* (2006.01)
  *F01N 3/10* (2006.01)
  *B01D 53/94* (2006.01)

(52) U.S. Cl.
  CPC ... 41/1401 (2013.01); *F02D 41/405* (2013.01); *F02D 2041/141* (2013.01); *F01N 3/106* (2013.01); *F02D 41/029* (2013.01); *F02D 41/0245* (2013.01); *Y02T 10/44* (2013.01); *F01N 2900/1602* (2013.01); *F02D 41/1446* (2013.01); *F02D 2200/0802* (2013.01); *F02D 2200/101* (2013.01); *F02D 2041/1409* (2013.01); *F02D 41/025* (2013.01)
  USPC .................................. 60/285; 60/286; 60/297

(56) References Cited

U.S. PATENT DOCUMENTS

| | | | |
|---|---|---|---|
| 8,261,535 B2 | 9/2012 | Marlett et al. | |
| 8,418,441 B2 * | 4/2013 | He et al. | 60/286 |
| 8,460,625 B2 * | 6/2013 | Takayanagi et al. | 423/212 |
| 8,474,247 B2 * | 7/2013 | Gomez, III | 60/295 |
| 2004/0226288 A1 | 11/2004 | Okugawa et al. | |
| 2004/0244366 A1 | 12/2004 | Hiranuma et al. | |
| 2005/0056009 A1 | 3/2005 | Otake et al. | |
| 2005/0166582 A1 | 8/2005 | Gotou | |
| 2013/0192205 A1 * | 8/2013 | He et al. | 60/274 |

FOREIGN PATENT DOCUMENTS

| | | |
|---|---|---|
| CN | 100337015 C | 9/2007 |
| CN | 101713320 A | 5/2010 |
| EP | 1 918 541 A1 | 5/2008 |
| JP | 2002-250218 | 9/2002 |
| JP | 2004-293339 | 10/2004 |
| JP | 2005-90359 | 4/2005 |
| JP | 2005-240672 | 9/2005 |
| JP | 3951619 | 8/2007 |
| JP | 2007-239740 | 9/2007 |
| JP | 2009-138702 | 6/2009 |
| JP | 2010-71203 | 4/2010 |

OTHER PUBLICATIONS

International Search Report issued Nov. 15, 2011 in corresponding International Application No. PCT/JP2011/068862.
The First Office Action issued May 26, 2014 in corresponding Chinese Application No. 201180031662.X (with English translation).

* cited by examiner

EXHAUST EMISSION CONTROL DEVICE OF DIESEL ENGINE

TECHNICAL FIELD

The present invention relates to an exhaust emission control device of a diesel engine, and particularly relates to regeneration control of a diesel particulate filter (hereinafter abbreviated as DPF) which collects particulate matter (hereinafter abbreviated as PM) contained in exhaust gas.

BACKGROUND ART

In emission control of a diesel engine, a reduction in PM is as important as a reduction in $NO_x$. As a technique effective for the reduction, DPF is well known.

The DPF is a PM collection device which uses a filter. In an engine operation state where an exhaust gas temperature is low, the PM is continuously accumulated in the DPF so that forced regeneration in which a temperature is forcibly increased and the PM is thereby burnt is performed.

In the forced regeneration of the DPF, late post injection (an injection timing is retarded and combustion is not caused in a cylinder) in which the PM is injected into a cylinder is performed, oxidation reaction is caused in a diesel oxidation catalyst (hereinafter abbreviated as DOC) disposed at a stage prior to the DPF, the temperature in the part of the DPF is increased to a high temperature by heat of reaction, and the PM accumulated in the DPF is thereby burnt.

Consequently, the temperature needs to be increased to the high temperature and, in terms of reducing a forced regeneration time period of the DPF, the temperature of gas passing through the DPF needs to be maintained as high as possible. However, when the temperature of the exhaust gas passing through the DPF is increased to the high temperature in a state where a large amount of the PM is accumulated in the DPF, there is danger that a large amount of the PM is burnt at once and the temperature is excessively increased.

On the other hand, when the gas temperature is set to a low value, the regeneration time period is prolonged and danger that late post injection fuel is dropped into an oil pan from the wall surface in the cylinder and an oil dilution quantity is increased is enhanced.

Accordingly, various improvements and proposals such as control in which an inlet temperature of the DPF is constantly maintained at a target inlet temperature and control in which the target inlet temperature is changed in accordance with the regeneration state of the DPF have been made.

For example, Japanese Patent Application Laid-open No. 2007-239740(Patent Document 1) discloses that an inlet temperature target value of the DPF is determined based on any of a soot accumulation quantity, a soot accumulation quantity change rate, a DPF temperature, and a DPF temperature change rate. regeneration state of the DPF have been made.

In addition, Japanese Patent No. 3951619 (Patent Document 2) discloses a technique in which a target DPF inlet temperature is stepwise changed such that the target temperature is increased to the target temperature at the next step when the target DPF inlet temperature is maintained for a predetermined period of time or longer.

Further, Japanese Patent Application Laid-open No. 2009-138702 (Patent Document 3) discloses that a period of time elapsed since start of the forced regeneration of the DPF is measured, a DPF inlet temperature target value is set to a lower value as the measured period of time is shorter, and a forced regeneration unit sets the injection quantity of sub fuel injection in accordance with the target temperature to perform the sub fuel injection.

Patent Document 1: Japanese Patent Application Laid-open No. 2007-239740

Patent Document 2: Japanese Patent No. 3951619

Patent Document 3: Japanese Patent Application Laid-open No. 2009-138702

However, when the target temperature is set in accordance with the regeneration elapsed time period, there are cases where the actual DPF temperature is completely different from the target temperature due to a difference in operation condition, and hence it is difficult to perform stable control. In addition, in the method using the PM accumulation quantity, it is necessary to estimate the PM accumulation quantity so that the method greatly depends on accuracy in estimation, and hence there is a problem that control logic becomes complicated.

DISCLOSURE OF THE INVENTION

The present invention has been achieved in view of the problems, and an object thereof is to provide an exhaust emission control device of a diesel engine capable of increasing the DPF temperature to reduce the regeneration time period in order to reduce the oil dilution quantity, and reducing the danger of an excessive temperature increase of the DPF in the forced regeneration of the DPF.

In order to solve the problems described above, the present invention is an exhaust emission control device of a diesel engine including a diesel oxidation catalyst (DOC) and a diesel particulate filter (DPF) which collects particulate matter (PM) in an exhaust passage and performing regeneration on the PM collected in the DPF, the exhaust emission control device including a regeneration control unit which increases, when an accumulation quantity of the PM exceeds a predetermined value, a temperature of the DPF to a temperature in a vicinity of a predetermined target set temperature to burn and remove the accumulated PM by controlling a temperature increase unit, the regeneration control unit including a late post fuel injection control unit which injects fuel into a combustion chamber at a timing when no contribution is made to combustion, the late post fuel injection control unit including a DPF target temperature setting unit which sets a target value of a DPF temperature including an inlet temperature, an exit temperature, or an internal temperature of the DPF, and a calculation portion which calculates a late post injection quantity command value based on a deviation between the target value of the DPF temperature set by the DPF target temperature setting unit and an actual DPF temperature, the DPF target temperature setting unit including a temperature increase rate setting portion which sets a temperature increase change rate such that, until the target set temperature at which the PM is burnt is reached after start of late post injection, the temperature increase change rate is reduced in accordance with an increase in temperature or a period of time elapsed since the start of the late post injection, and a target temperature of the DPF temperature being calculated based on the temperature increase rate from the temperature increase rate setting portion.

According to the invention described above, since the DPF target temperature setting unit includes the temperature increase rate calculation portion which sets the temperature increase change rate such that, until the target set temperature at which the PM is burnt is reached after the start of the late post injection, the temperature increase change rate is reduced in accordance with the period of time elapsed since the start of the late post injection or the increase in DPF temperature, and the target temperature of the DPF temperature is calculated based on the temperature increase rate from the temperature increase rate calculation portion, when the DPF temperature, e.g., the DPF inlet temperature is low (e.g., about 300° C.), the target temperature is quickly increased and, when the DPF inlet temperature is high (e.g., about 570° C.), the target temperature is slowly increased.

With this arrangement, it is possible to quickly attain the target set temperature (610 to 650° C.) as the combustion temperature of the DPF, prevent an excessive temperature increase, and reduce an oil dilution quantity while reducing the danger of the excessive temperature increase of the DPF.

In addition, even when an operation condition is changed and temperature increase characteristics are changed accordingly, the change rate of the target temperature determined by the temperature increase rate setting portion is determined and the target temperature is determined by using the change rate, and hence it is possible to stably attain the target set temperature and stably perform temperature increase control.

In addition, in the invention described above, the temperature increase rate setting portion of the DPF target temperature setting unit may preferably include a first temperature increase rate setting portion which sets the temperature increase change rate of the target temperature such that the temperature increase change rate of the target temperature is stepwise or continuously reduced in accordance with the increase in temperature.

Specifically, the stepwise temperature increase change rate in the first temperature increase rate setting portion may preferably include two stages of a first-stage change rate and a second-stage change rate lower than the first-stage change rate, the target set temperature may preferably correspond to the DPF inlet temperature of 610 to 650° C., and a switching temperature at which the change rate is switched between the first-stage and second-stage change rates may preferably correspond to the DPF inlet temperature of 500 to 600° C.

In this manner, the switching temperature of the change rate is set to the DPF inlet temperature of 500 to 600° C., the target temperature is quickly increased at the first-stage change rate until the DPF inlet temperature reaches the switching temperature, and the target temperature is slowly increased at the second-stage change rate lower than the first-stage change rate when the DPF inlet temperature exceeds the switching temperature. Consequently, it is possible to quickly attain the target set temperature and prevent the excessive temperature increase.

Further, in the invention described above, the temperature increase rate setting portion of the DPF target temperature setting unit may preferably include a second temperature increase rate setting portion which sets the temperature increase change rate of the target temperature such that the temperature increase change rate of the target temperature is stepwise or continuously reduced until the target set temperature is reached in accordance with the period of time elapsed since the start of the late post injection.

Specifically, the stepwise temperature increase change rate in the second temperature increase rate setting portion may preferably include two stages of a first-stage change rate and a second-stage change rate lower than the first-stage change rate, the target set temperature may preferably correspond to the DPF inlet temperature of 610 to 650° C., and switching time when the change rate is switched between the first-stage and second-stage change rates may preferably be set after a lapse of a predetermined period of time after the start of the late post injection.

As described above, since the switching between the first-stage and second-stage change rates is set after the lapse of the predetermined period of time after the start of the late post injection, it becomes possible to manage a regeneration behavior of the DPF by using time so that the regeneration behavior can be made constant and the management thereof is thereby facilitated.

Furthermore, in the invention described above, the exhaust emission control device of a diesel engine may preferably further include a feed forward control portion which calculates a basic command value of the late post injection quantity command value in accordance with an operation state of the engine, and a feed forward correction unit which corrects the command value from the feed forward control portion in accordance with the calculated target temperature of the DPF temperature.

That is, since the DPF target temperature is changed, the required feed forward quantity, i.e., the basic command value is changed. Accordingly, by correcting the basic command value, it is possible to perform the stable late post fuel injection. In particular, it becomes possible to control the late post fuel injection quantity when the target set temperature is approached with high accuracy, and hence it is possible to reduce the danger of the excessive temperature increase of the DPF.

According to the present invention, since the temperature increase change rate of the target temperature is set by the temperature increase rate setting portion of the DPF target temperature setting unit such that, until the target set temperature at which the PM is burnt is reached after the start of the late post injection, the temperature increase change rate of the target temperature is reduced in accordance with the increase in temperature or the period of time elapsed since the start of the late post injection, it is possible to quickly attain the target set temperature (610 to 650° C.) as the combustion temperature of the DPF, prevent the excessive temperature increase, and reduce the oil dilution quantity while reducing the danger of the excessive temperature increase of the DPF.

BEST MODE FOR CARRYING OUT THE INVENTION

A detailed description is given hereinbelow of the present invention by using embodiments shown in the drawings. Note that the scope of the present invention is not limited only to dimensions, materials, shapes, and relative arrangements of constituent parts described in the embodiments unless specifically described.

Figure 1:
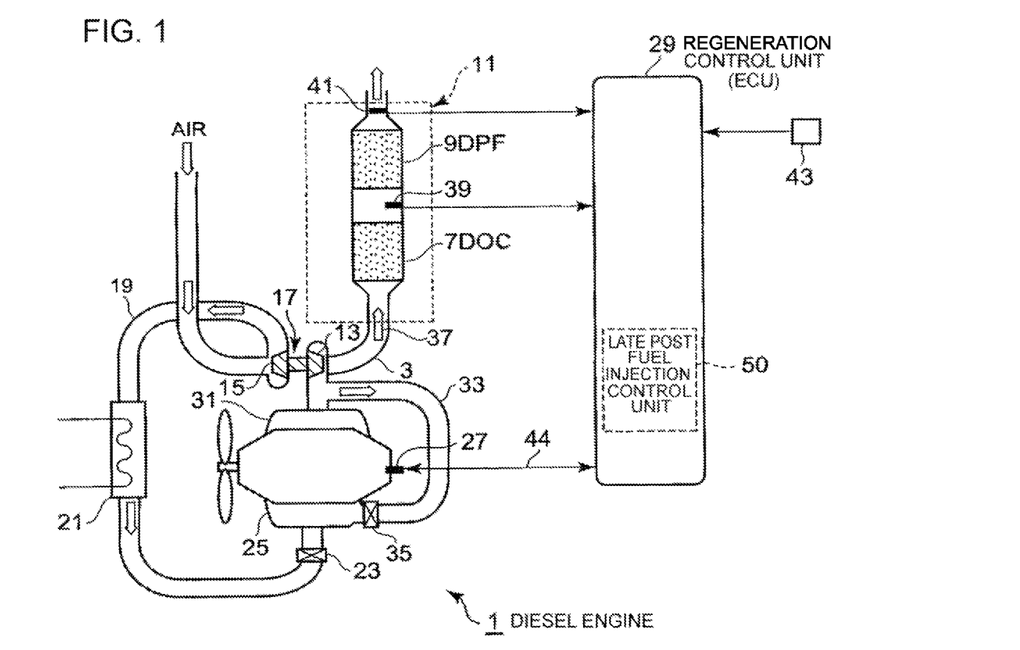
FIG. 1 is a schematic structural view of an exhaust emission control device of a diesel engine according to embodiments of the present invention.

With reference to FIG. 1, a description is given of the overall structure of an exhaust emission control device of a diesel engine according to the present invention.

As shown in FIG. 1, in an exhaust passage 3 of a diesel engine (hereinafter referred to as an engine) 1, there is provided an exhaust emission aftertreatment device 11 including DOC 7 and DPF 9 for collecting PM which is disposed on the downstream side of the DOC 7.

In addition, in the exhaust passage 3, there is provided an exhaust turbocharger 17 having an exhaust turbine 13 and a compressor 15 which is driven coaxially by the exhaust turbine 13. Air discharged from the compressor 15 of the exhaust turbocharger 17 enters into an intercooler 21 through an air supply passage 19 to be cooled, and the flow rate of the air is controlled by an intake throttle valve 23. Thereafter, the air flows into a combustion chamber from an intake manifold 25 through an intake port via an intake valve of the engine 1.

Further, in the engine 1, a fuel injection device (not shown) which controls the injection timing, injection quantity, and injection pressure of fuel to inject the fuel into the combustion chamber is connected to a regeneration control unit (ECU) 29 via a connection terminal 27.

Furthermore, an EGR (Exhaust Gas Recirculation) passage 33 is branched from some midpoint in the exhaust passage 3 or an exhaust manifold 31, and a part of exhaust gas is sent to the part on the downstream side of the intake throttle valve 23 via an EGR valve 35.

Combustion gas resulting from combustion in the combustion chamber of the engine 1, i.e., exhaust gas 37 passes through the exhaust manifold 31 and the exhaust passage 3, drives the exhaust turbine 13 of the exhaust turbocharger 17 to serve as the power source of the compressor 15, and then flows into the exhaust emission aftertreatment device 11 through the exhaust passage 3.

Moreover, to the regeneration control unit 29 of the DPF 9, signals from a DPF inlet temperature sensor 39 and a DPF exit temperature sensor 41 are inputted. In addition, a fuel injection quantity signal 44 from an engine rotation speed sensor 43 and the fuel injection device is also inputted to the regeneration control unit (ECU) 29. Further, in the regeneration control unit 29, there are provided a storage portion which stores various map data items and a timer which measures a period of time elapsed since the start of late post fuel injection.

When the accumulation quantity of the PM accumulated in the DPF 9 exceeds a predetermined value, the regeneration control unit 29 increases the inlet temperature of the DPF 9 to a temperature in the vicinity of a target set temperature (610 to 650° C.) to burn and remove the accumulated PM by controlling a temperature increase unit.

First, the burning and removing of the PM by the regeneration control unit 29 is described.

When a condition for starting forced regeneration is judged on the basis of, e.g., the running distance, the operation time of an engine, or the total fuel consumption quantity in the case of a vehicle, and the forced regeneration is started, DOC temperature increase control for activating the DOC 7 is executed. In the DOC temperature increase control, the quantity of air flowing into the combustion chamber is reduced by reducing the opening of the intake throttle valve 23, and unburned fuel in the exhaust gas is thereby increased. In addition, in early post injection, the first post injection which injects fuel in a quantity smaller than that in main injection is performed immediately after the main injection in a state where the pressure in the cylinder is still high. By the early post injection, an exhaust gas temperature is increased without influencing the output of the engine, and the exhaust gas having the increased temperature flows into the DOC 7 to thereby activate the DOC 7. Subsequently, the unburned fuel in the exhaust gas is oxidized with the activation of the DOC 7, and the exhaust gas temperature is increased by heat of oxidation generated during the oxidation.

Then, it is determined whether a DOC inlet temperature reaches a predetermined temperature or the DPF inlet temperature reaches a predetermined temperature and, when the DOC inlet temperature or the DPF inlet temperature exceeds the predetermined temperature, the inlet temperature of the DPF 9 is further increased by late post injection. The late post injection mentioned herein denotes the second post injection which injects the fuel in a state where the crank angle is near the bottom dead center after the early post injection. By the late post injection, the fuel is flown from the combustion chamber to the exhaust passage 3 when the exhaust valve is open, the discharged fuel is caused to react in the already activated DOC 7, the exhaust gas temperature is further increased by the generated heat of oxidation to a temperature required for the regeneration of the DPF 9 such as, e.g., 610 to 650° C., and the burning of the PM is thereby facilitated.

Next, a description is given of the above-mentioned late post injection with reference to FIG. 12 which is explained later in a fifth embodiment in which the outline of late post injection quantity control in the regeneration control unit 29 is described.

The regeneration control unit 29 includes a late post fuel injection control unit 50 which injects the fuel at a timing when no contribution is made to combustion in the combustion chamber, and the late post fuel injection control unit 50 includes a feed forward control unit 53 which specifies a basic injection quantity (basic operation quantity) of the late post injection quantity based on a feed forward quantity map (FF map) 51 in which the basic injection quantity is set based on the engine rotation speed and the fuel injection quantity (engine load), and a feed back control unit 55 which specifies a late post correction injection quantity (correction operation quantity) based on a deviation between the target inlet temperature of the DPF 9 and the actual DPF inlet temperature.

The feed back control unit 55 includes a DPF target temperature setting unit 52 which sets the target value of the inlet temperature of the DPF, inputs the actual DPF inlet temperature and the target inlet temperature to an adder-subtracter 57 to calculate a deviation therebetween as a control quantity, and performs a feed back calculation on the deviation in a PID calculation portion (calculation portion) 59 to calculate a correction injection quantity as a feed back control command value.

Subsequently, the basic injection quantity from the feed forward control unit 53 and the correction injection quantity from the feedback control unit 55 are added together in an adder 61, and outputted as a late post fuel injection quantity command signal.

The present invention increases the target temperature set by the DPF target temperature setting unit 52 of the feed back control unit 55 to reduce the regeneration time period, allow the regeneration process to be completed in a short time period, and reduce the oil dilution quantity, and sets the target temperature which allows a reduction in the danger of the excessive temperature increase of the DPF.

(First Embodiment)

Figure 2:
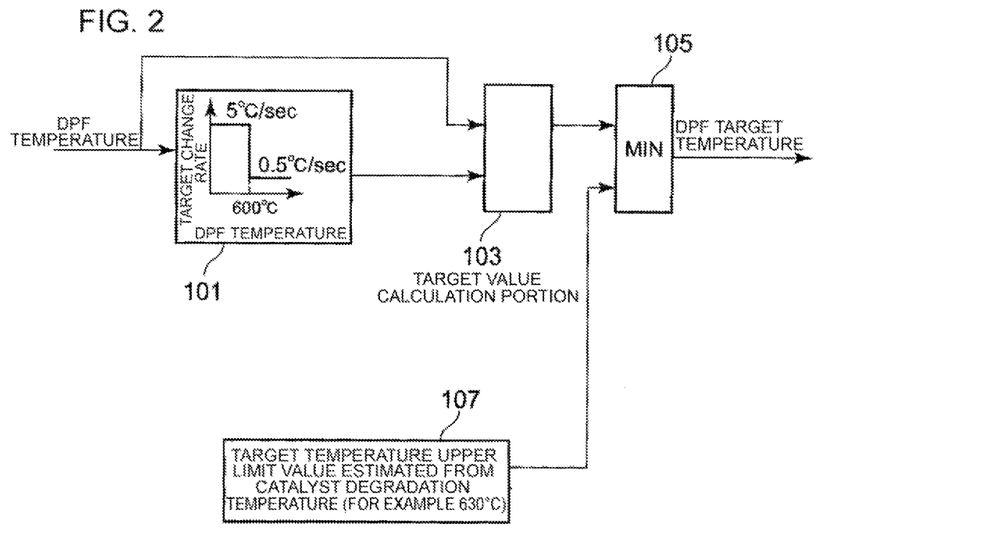
FIG. 2 is a structural block diagram showing a first embodiment of a DPF target temperature setting unit.
Figure 3:
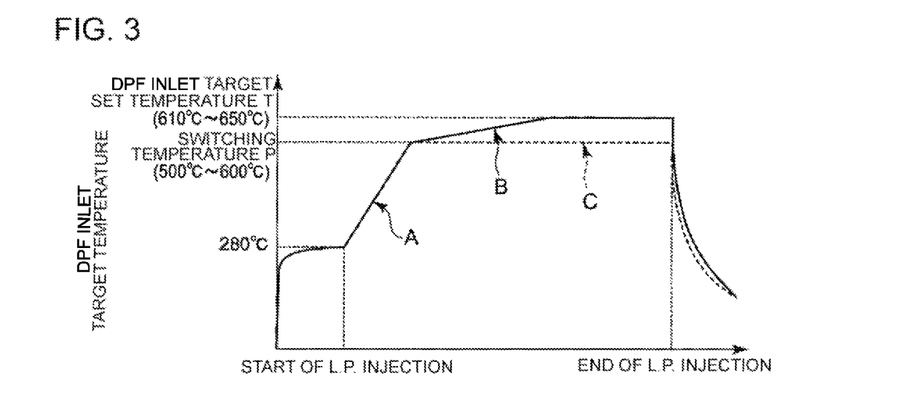
FIG. 3 is an explanatory view showing a change in DPF inlet temperature target value in the first embodiment.

With reference to FIGS. 2 and 3, a first embodiment of the DPF target temperature setting unit 52 is described.

In FIG. 2, the actually measured value of the DPF inlet temperature is inputted from the DPF inlet temperature sensor 39. Based on the temperature, the target change rate (increase rate) of the DPF inlet temperature is calculated by using a first target change rate map (first temperature increase rate setting portion) 101. In the first target change rate map 101, the increase rate is constantly 5° C./sec when the temperature is not mare than 600° C., while the increase rate is 0.5° C./sec when the temperature exceeds 600° C.

Note that, as the temperature inputted to the first target change rate map 101, the target temperature calculated at the previous calculation cycle may also be used instead of the actually measured value inputted from the DPF inlet temperature sensor 39. This is because the actually measured value can be considered as a value substantially equal to the value of the target temperature.

Next, in a target value calculation portion 103, the target temperature is calculated based on the actually measured value of the DPF inlet temperature and the calculated target change rate. The target temperature is inputted to a selection portion 105, and a signal from a target temperature upper limit value setting portion 107 which sets the upper limit value of the target temperature is also inputted to the selection portion 105. The target temperature upper limit value mentioned herein denotes the upper limit value of the target temperature which is set on the basis of the temperature at which catalyst degradation of the DPF 9 occurs. The target temperature upper limit value is set to, e.g., 630° C.

Then, in the selection portion 105, the smaller one of the calculated value of the target value calculation portion 103 and the target temperature upper limit value is selected and outputted as the target temperature of the DPF inlet temperature.

FIG. 3 shows the state of a change in DPF inlet target temperature. For example, when the late post fuel injection is started at the DPF inlet temperature of 280° C., a first-stage temperature increase is performed at a constant rate of a first-stage change rate (first-stage temperature increase rate) of 5° C./sec. That is, the temperature increase corresponds to the part of a constant gradient A.

Next, when the switching temperature of the change rate of 600° C. (500 to 600° C.) is reached, thereafter, a second-stage temperature increase is performed at a constant rate of a second-stage change rate (second-stage temperature increase rate) of 0.5° C./sec. That is, the temperature increase corresponds to the part of a constant gradient B.

Subsequently, when the inlet target set temperature of the DPF 9, e.g., 630° C. (610 to 650° C.) is reached, the constant gradient temperature increase control is ended and the DPF target temperature setting unit 52 is controlled such that 630° C. (610 to 650° C.) is maintained. Note that a dotted line C indicates, as a conventional art, a case where the DPF inlet target set temperature is constantly 600° C.

Thus, the temperature increase rate of the inlet target temperature of the DPF is changed in two stages. The switching temperature of the temperature increase rate of the target temperature is set to 500 to 600° C. in the DPF inlet temperature, the target temperature is quickly increased at the first-stage change rate of 5° C./sec until the DPF inlet temperature reaches the switching temperature and, when the DPF temperature exceeds the switching temperature, the target temperature is slowly increased by changing the temperature at the second-stage change rate of 0.5° C./sec which is lower than the first-stage change rate. Consequently, it is possible to quickly attain the target set temperature and prevent the excessive temperature increase.

Accordingly, it is possible to quickly attain a DPF inlet target set temperature T (610 to 650° C.) as the combustion temperature of the DPF 9 and prevent the excessive temperature increase, and reduce the oil dilution quantity while reducing the danger of an excessive temperature increase of the DPF.

In addition, by inputting the target temperature upper limit value to the selection portion 105 such that the target temperature upper limit value set based on the degradation temperature of the DPF catalyst is not exceeded, it is possible to prevent the problem caused by the excessive temperature increase of the DPF.

Further, for example, the target set temperature (610 to 650° C.) is set to a value closest to the upper limit value by setting the target temperature upper limit value such that the target temperature upper limit value corresponds to the inlet temperature target set value T and the target set value is increased, whereby it is possible to allow the regeneration at a high temperature, improve regeneration efficiency, and reduce the oil dilution quantity.

(Second Embodiment)

Figure 4:
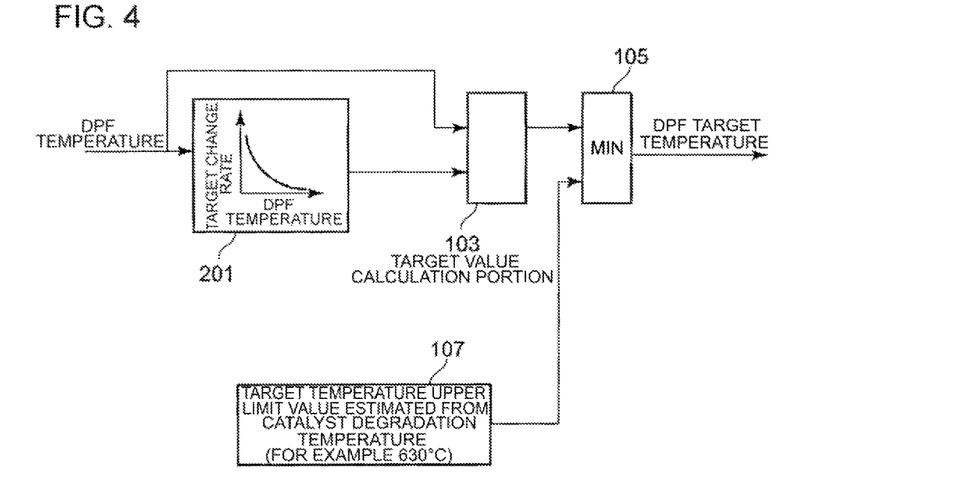
FIG. 4 is a structural block diagram showing a second embodiment.
Figure 5:
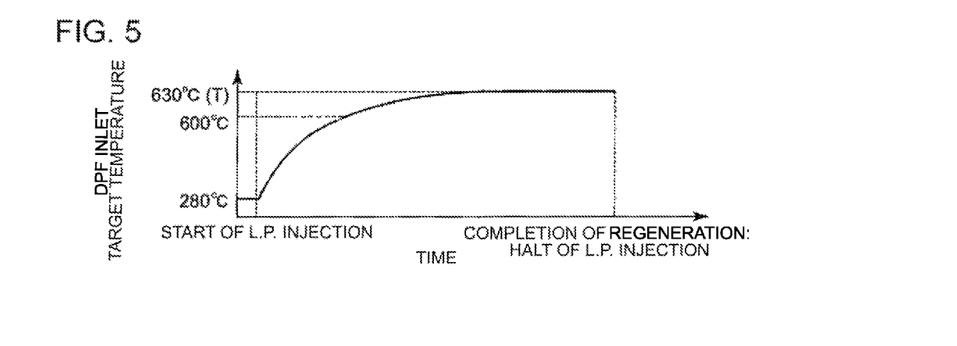
FIG. 5 is an explanatory view showing a change in DPF inlet temperature target value in the second embodiment.

With reference to FIGS. 4 and 5, a second embodiment of the DPF target temperature setting unit 52 is described.

The temperature increase rate is changed in two stages in the first embodiment, while the second embodiment is characterized in that the temperature increase rate is continuously changed until the target set temperature T is reached. The structure of the second embodiment is otherwise the same as that of the first embodiment.

Instead of the first target change rate map 101 of the first embodiment, a second target change rate map (first temperature increase rate setting portion) 201 shown in FIG. 4 is used in the second embodiment. The second target change rate map 201 has a feature in which the change rate (increase rate) of the DPF inlet temperature is continuously reduced as the DPF inlet temperature is increased.

Consequently, the DPF inlet temperature target value is calculated on the basis of the continuously changing change rate of the target temperature, and hence the inlet temperature target value can be minutely calculated so that it is possible to enhance accuracy in the calculation of the inlet temperature target value. Consequently, even when the target set temperature T is set to a value closest or equal to the target upper limit value, the control of the target temperature is stabilized, and hence it is possible to reliably prevent the excessive temperature increase.

FIG. 5 shows the state of a change in DPF inlet target temperature. From the start of the late post injection to the target set temperature T, the DPF inlet target temperature is changed such that the increase rate is continuously reduced as the DPF inlet target temperature is increased.

(Third Embodiment)

Figure 6:
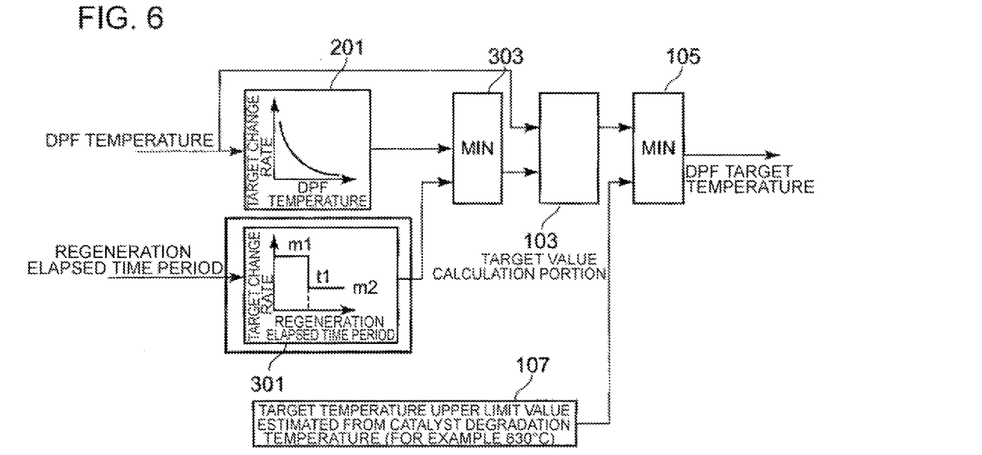
FIG. 6 is a structural block diagram showing a third embodiment.
Figure 7:
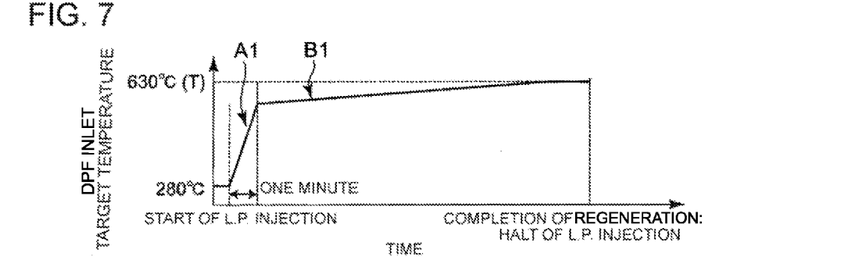
FIG. 7 is an explanatory view showing a change in DFP inlet temperature target value in the third embodiment.

With reference to FIGS. 6 and 7, a third embodiment of the DPF target temperature setting unit 52 is described.

The temperature increase rate of the DPF temperature or the DPF target temperature is changed in each of the first and second embodiments, while in the third embodiment, the target change rate is changed in accordance with a period of time elapsed since the start of the late post fuel injection. Consequently, the third embodiment is characterized in that a third target change rate map (second temperature increase rate setting portion) 301 is further provided.

In the third target change rate map 301 of FIG. 6, in accordance with a regeneration elapsed time period, e.g., a period of time elapsed since the start of the late post fuel injection, the target change rate is constantly m1 when the regeneration elapsed time period is not longer than t1 and, when the regeneration elapsed time period is longer than t1, the increase rate is constantly m2. The output from the second target change rate map 201 and the output from the third target change rate map 301 are inputted to a selection portion 303, and the smaller one of them is selected and inputted to the target value calculation portion 103.

FIG. 7 shows the state of a change in DPF inlet target temperature. For example, assuming that t1=1 minute is satisfied, when the late post fuel injection is started at the DPF inlet temperature of 280° C., a first-stage temperature increase is performed at a constant rate of a first-stage change rate m1. That is, the temperature increase corresponds to the part of a constant gradient A1.

Next, when the elapsed time period reaches one minute, thereafter, a second-stage temperature increase is performed at a constant rate of a second-stage change rate m2. That is, the temperature increase corresponds to the part of a constant gradient B1.

Subsequently, when the inlet target set temperature of the DPF 9, i.e., 630° C. (610 to 650° C.) is reached, the constant gradient temperature increase control is ended and the DPF target temperature setting unit 52 is controlled such that 630° C. (610 to 650° C.) is maintained. Note that the time t1 is calculated by a timer incorporated in the regeneration control device 29.

Thus, the temperature increase rate of the inlet target temperature of the DPF 9 is changed in two stages. The target temperature is quickly increased at the first-stage change rate m1 and, when the elapsed time period exceeds one minute, the target temperature is slowly increased at the second-stage change rate m2 which is lower than the first-stage change rate. Consequently, it is possible to quickly attain the target set temperature and prevent the excessive temperature increase.

Further, the switching between the first-stage change rate and the second-stage change rate is set after a lapse of a predetermined period of time after the start of the late post injection, and hence it becomes possible to manage the regeneration behavior of the DPF by using time so that the regeneration behavior can be made constant and stabilized.

(Fourth Embodiment)

Figure 8:
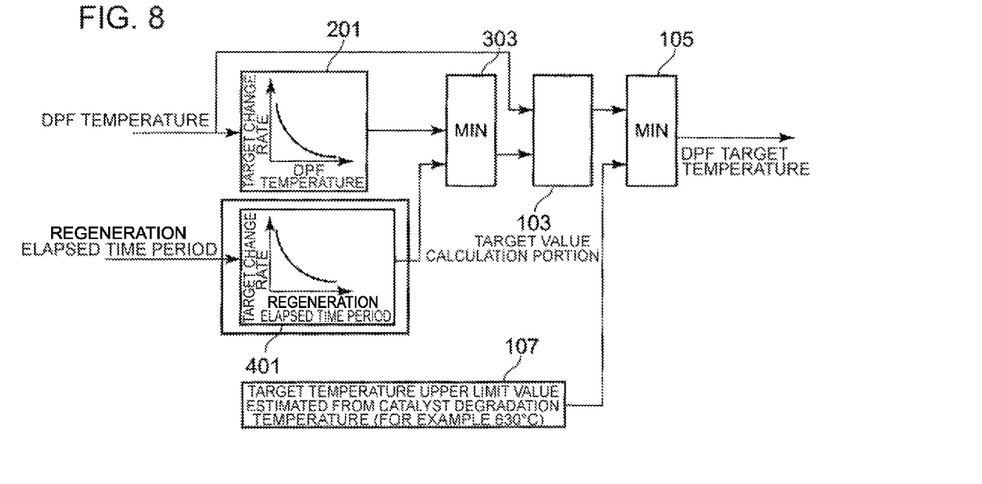
FIG. 8 is a structural block diagram showing a fourth embodiment.
Figure 9:
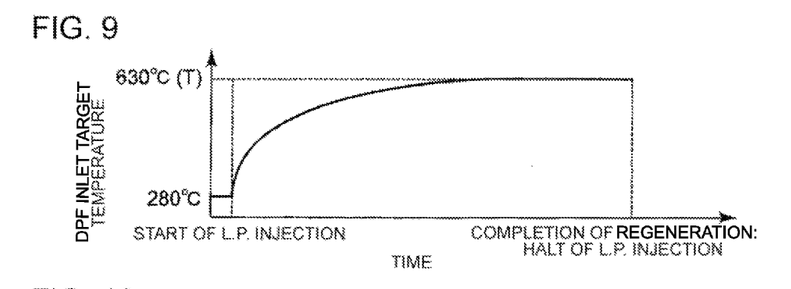
FIG. 9 is an explanatory view showing a change in DPF inlet temperature target value in the fourth embodiment.

With reference to FIGS. 8 and 9, a fourth embodiment of the DPF target temperature setting unit 52 is described.

In contrast to the change in two stages of the third target change rate map 301 of the third embodiment, the fourth embodiment is characterized in that a fourth target change rate map (second temperature increase rate setting portion) 401 having a feature in which the change rate is continuously changed is provided.

The fourth target change rate map 401 has a feature in which the change rate (increase rate) of the DPF inlet temperature is continuously reduced with an increase in regeneration elapsed time period.

Consequently, the DPF inlet temperature target value is calculated on the basis of the change rate of the target temperature which changes with the increase in regeneration elapsed time period, and hence it is possible to minutely calculate the inlet temperature target value.

As a result, it is possible to enhance accuracy in the calculation of the inlet temperature target value. Consequently, even when the target set temperature T is set to a value closest or equal to the target upper limit value, the control of the target temperature is stabilized, and hence it is possible to reliably prevent the excessive temperature increase.

FIG. 9 shows the state of a change in DPF inlet target temperature. From the start of the late post injection to the target set temperature T, the DPF inlet target temperature is changed such that the increase rate is continuously reduced as the DPF inlet target temperature is increased.

(Fifth Embodiment)

Figure 10:
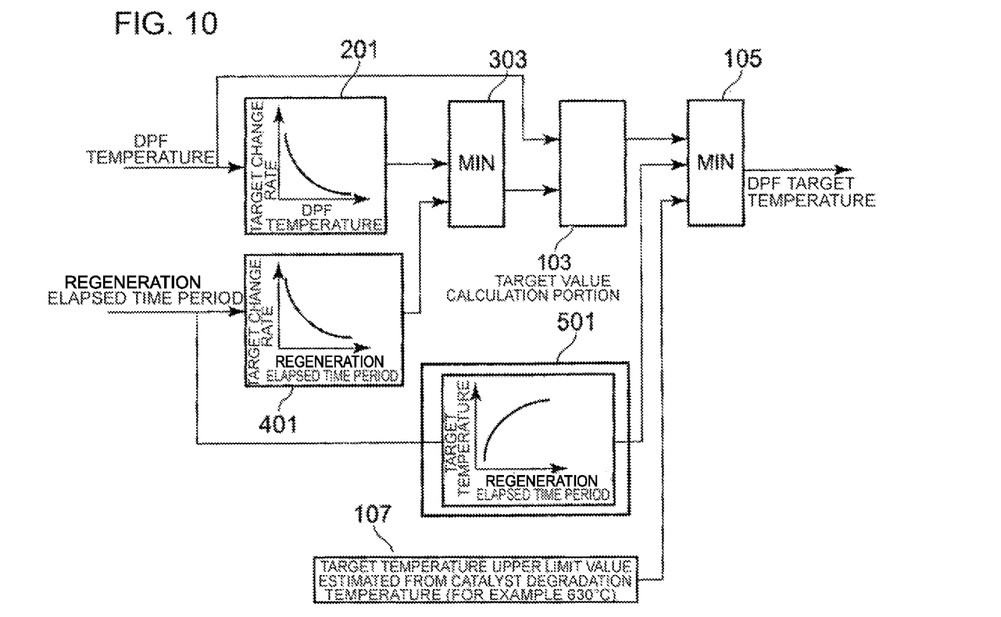
FIG. 10 is a structural block diagram showing a fifth embodiment.
Figure 11:
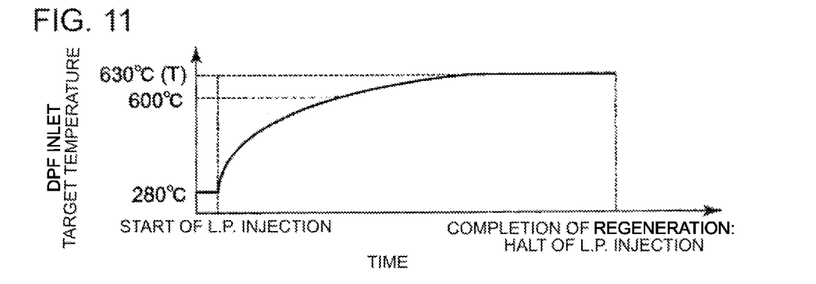
FIG. 11 is an explanatory view showing a change in DPF inlet temperature target value in the fifth embodiment.

With reference to FIGS. 10 and 11, a fifth embodiment of the DPF target temperature setting unit 52 is described.

In contrast to the third and fourth embodiments, the fifth embodiment is characterized in that a target temperature map 501 in which the target temperature is set based on the period of time elapsed since the start of the late post fuel injection is further provided.

The target temperature calculated from the target temperature map 501 in which the target temperature is set in accordance with the period of time elapsed since the start of the late post fuel injection is directly inputted to the selection portion 105 and the minimum value is thereby calculated, and hence, even when there is an error in the variations of the elapsed time period or the DPF temperature (data on the measurement of the DPF inlet temperature) in a case where the target temperature is calculated by using the second target change rate map 201 or the fourth target change rate map 401, the target temperature is reliably set by the target temperature map 501 so that the control of the late post fuel injection quantity is stabilized.

FIG. 11 shows the state of a change in DPF inlet target temperature. From the start of the late post injection to the target set temperature T, the DPF inlet target temperature is changed such that the increase rate is continuously reduced as the DPF inlet target temperature is increased.

(Sixth Embodiment)

Figure 12:
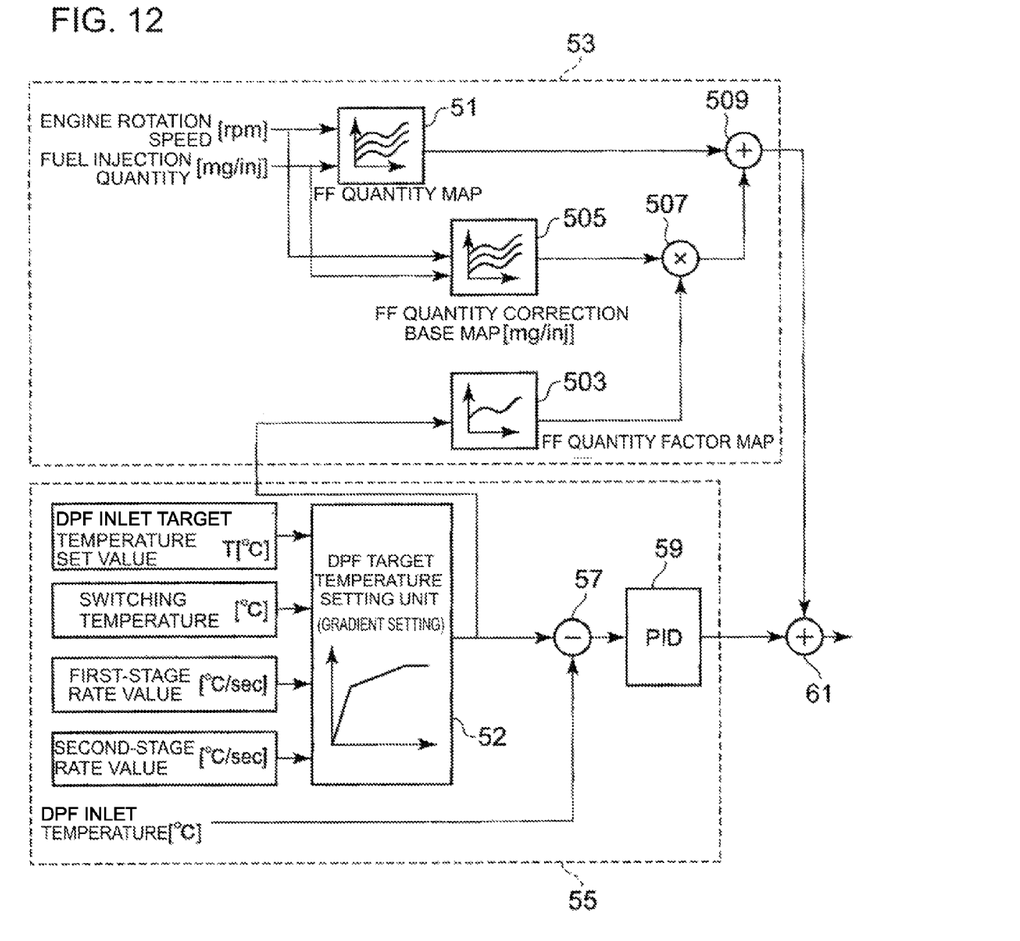
FIG. 12 is a structural block diagram showing a sixth embodiment.

With reference to FIG. 12, a sixth embodiment is described.

As described above, the regeneration control unit 29 includes the feed forward control portion 53 which calculates the basic command value of the late post injection quantity command value in accordance with the operation state of the engine, and the feed back control unit 55 which specifies the late post correction injection quantity (correction operation quantity) based on the deviation between the target inlet temperature of the DPF 9 and the actual DPF inlet temperature.

In the sixth embodiment, the target inlet temperature of the feed back control unit 55 is changed, and hence it is necessary to change a feed forward quantity correspondingly to the change. Consequently, the sixth embodiment is characterized in that an FF factor map (feed forward correction unit) 503 which corrects the feed forward quantity is provided.

The setting of the target temperature in the DPF target temperature setting unit 52 in FIG. 12 is as described in each of the first to fifth embodiments, and the setting of the first embodiment is shown as an example in FIG. 12.

The DPF inlet target temperature set value T (° C.), the switching temperature (° C.), the first-stage increase rate (° C./sec), and the second-stage increase rate (° C./sec) are inputted, and the DPF inlet target temperature is calculated.

The actually measured DPF inlet temperature and the above-described DPF inlet target temperature are inputted to the adder-subtracter 57, the deviation therebetween is calculated as the control quantity, the deviation is subjected to the feedback calculation in the PID calculation portion 59, and the feed back control command value is calculated and outputted to the adder 61.

On the other hand, in the feed forward control unit 53, the late post injection quantity for maintaining the switching temperature (e.g., 600° C.) is set in the FF (feed forward) quantity map 51.

In addition, in an FF quantity correction base map 505, a difference between the late post injection quantity for maintaining the DPF inlet temperature target set value T (e.g., 630° C.) and the late post injection quantity for maintaining the switching temperature is set.

Further, in the FF quantity factor map 503, there is set a control factor corresponding to the ratio between (the inlet temperature target set value T–the switching temperature) and the inlet target temperature after the switching temperature is reached, i.e., the temperature position of the inlet target temperature between the inlet temperature target set value T and the switching temperature after the switching temperature is reached.

With the configuration described above, the target temperature set by the DPF target temperature setting unit 52 is inputted to the adder-subtracter 57, and the control factor corresponding to the target temperature is calculated by using the FF quantity factor map 503.

Then, the late post injection quantity to be corrected calculated by the FF quantity correction base map 505 is multiplied by the control factor in a multiplier 507. The correction quantity of the late post injection quantity suitable for the target temperature is calculated in the multiplier 507, the correction quantity is inputted to an adder 509 to be added to the control quantity from the FF quantity map 51, and outputted as a feed forward command value. Subsequently, the feed forward command value is added to the command value from the feed back control unit 55 in the adder 61.

Note that the correction control in which the control factor corresponding to the target temperature is calculated by using the FF quantity factor map 503 and the multiplication using the control factor is performed in the multiplier 507 is a control operation which is performed only during the second-stage change (the second-stage temperature increase rate).

Consequently, the correction is not performed during the first-stage change (the first-stage temperature increase rate). That is, the switching temperature 600° C. is already reached in a region during the second-stage change, and hence there is a possibility that an overshoot occurs and the excessive temperature increase is caused depending on the subsequent temperature increase control. Accordingly, it is necessary to determine the late post fuel injection quantity with high accuracy. Therefore, as in the present embodiment, the late post fuel injection quantity is corrected in accordance with the target temperature and the late post fuel injection quantity is stably and reliably controlled. On the other hand, during the first-stage change, it is an objective to quickly attain the temperature of about 600° C. which allows combustion, and hence the feed forward quantity of the feed forward control unit 53 is not corrected based on the target temperature set by the DPF target temperature setting unit 52.

According to the sixth embodiment, since the DPF target temperature is changed, by correcting the required feed forward quantity, i.e., the basic command value, it is possible to perform the stable late post fuel injection. In particular, even when the regeneration time period is reduced, the regeneration efficiency is enhanced, and the oil dilution quantity is reduced by setting the DPF inlet temperature target set value T (e.g., 630° C.) to a temperature higher than about 600° C. as the conventional temperature to increase the DPF temperature to a high temperature, it is possible to reduce the danger of the excessive temperature increase of the DPF.

In the description of each of the first to sixth embodiments, although the description has been made with the inlet temperature of the DPF used as the object of the control, the exit temperature or the internal temperature may also be controlled as the object.

INDUSTRIAL APPLICABILITY

According to the present invention, in forced regeneration of DPF, it is possible to increase a DPF temperature to a high temperature to reduce a recognition time period in order to reduce an oil dilution quantity and also reduce the danger of an excessive temperature increase of the DPF, and hence the present invention is suitably used in an exhaust emission control device of a diesel engine.

The invention claimed is:

1. An exhaust emission control device of a diesel engine comprising a diesel oxidation catalyst (DOC) and a diesel particulate filter (DPF) which collects particulate matter (PM) in an exhaust passage and performing regeneration on the PM collected in the DPF, the exhaust emission control device comprising:
a regeneration control unit which increases, when an accumulation quantity of the PM exceeds a predetermined value, a temperature of the DPF to a temperature in a vicinity of a predetermined target set temperature to burn and remove the accumulated PM by controlling a temperature increase unit,
the regeneration control unit comprising a late post fuel injection control unit which injects fuel into a combustion chamber at a timing when no contribution is made to combustion, the late post fuel injection control unit comprising a DPF target temperature setting unit which sets a target value of a DPF temperature including an inlet temperature, an exit temperature, or an internal temperature of the DPF, and a calculation portion which calculates a late post injection quantity command value based on a deviation between the target value of the DPF temperature set by the DPF target temperature setting unit and an actual DPF temperature,
the DPF target temperature setting unit comprising a temperature increase rate setting portion which sets a temperature increase change rate such that, until the target set temperature at which the PM is burnt is reached after start of late post injection, the temperature increase change rate is reduced in accordance with an increase in temperature or a period of time elapsed since the start of the late post injection, and
a target temperature of the DPF temperature being calculated based on the temperature increase rate from the temperature increase rate setting portion.

2. The exhaust emission control device of a diesel engine according to claim 1, wherein the temperature increase rate setting portion of the DPF target temperature setting unit comprises a first temperature increase rate setting portion which sets the temperature increase change rate of the target temperature such that the temperature increase change rate of the target temperature is stepwise or continuously reduced in accordance with the increase in temperature.

3. The exhaust emission control device of a diesel engine according to claim 2, wherein the stepwise temperature increase change rate in the first temperature increase rate setting portion comprises two stages of a first-stage change rate and a second-stage change rate lower than the first-stage change rate, the target set temperature corresponds to the DPF inlet temperature of 610 to 650° C., and a switching temperature at which the change rate is switched between the first-stage and second-stage change rates corresponds to the DPF inlet temperature of 500 to 600° C.

4. The exhaust emission control device of a diesel engine according to claim 1, wherein the temperature increase rate setting portion of the DPF target temperature setting unit comprises a second temperature increase rate setting portion which sets the temperature increase change rate of the target temperature such that the temperature increase change rate of the target temperature is stepwise or continuously reduced until the target set temperature is reached in accordance with the period of time elapsed since the start of the late post injection.

5. The exhaust emission control device of a diesel engine according to claim 4, wherein the stepwise temperature increase change rate in the second temperature increase rate setting portion comprises two stages of a first-stage change rate and a second-stage change rate lower than the first-stage change rate, the target set temperature corresponds to the DPF inlet temperature of 610 to 650° C., and switching time when the change rate is switched between the first-stage and second-stage change rates is set after a lapse of a predetermined period of time after the start of the late post injection.

6. The exhaust emission control device of a diesel engine according to claim 1, further comprising:
   a feed forward control portion which calculates a basic command value of the late post injection quantity command value in accordance with an operation state of the engine; and
   a feed forward correction unit which corrects the command value from the feed forward control portion in accordance with the calculated target temperature of the DPF temperature.

7. The exhaust emission control device of a diesel engine according to claim 1, wherein an upper limit value of the target set temperature is an upper limit value that is set based on a temperature at which catalyst degradation of the DPF occurs.

8. The exhaust emission control device of a diesel engine according to claim 2, wherein an upper limit value of the target set temperature is an upper limit value that is set based on a temperature at which catalyst degradation of the DPF occurs.

9. The exhaust emission control device of a diesel engine according to claim 3, wherein an upper limit value of the target set temperature is an upper limit value that is set based on a temperature at which catalyst degradation of the DPF occurs.

10. The exhaust emission control device of a diesel engine according to claim 4, wherein an upper limit value of the target set temperature is an upper limit value that is set based on a temperature at which catalyst degradation of the DPF occurs.

11. The exhaust emission control device of a diesel engine according to claim 5, wherein an upper limit value of the target set temperature is an upper limit value that is set based on a temperature at which catalyst degradation of the DPF occurs.

12. The exhaust emission control device of a diesel engine according to claim 6, wherein an upper limit value of the target set temperature is an upper limit value that is set based on a temperature at which catalyst degradation of the DPF occurs.

* * * * *